(12) United States Patent
Adams et al.

(10) Patent No.: US 11,468,407 B2
(45) Date of Patent: *Oct. 11, 2022

(54) METHOD AND SYSTEM FOR UPDATING MESSAGE THREADS

(71) Applicant: BlackBerry Limited, Waterloo (CA)

(72) Inventors: Neil Patrick Adams, Waterloo (CA); Raymond Paul Vander Veen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,831

(22) Filed: Jul. 29, 2021

(65) Prior Publication Data

US 2021/0357866 A1  Nov. 18, 2021

Related U.S. Application Data

(63) Continuation of application No. 16/057,053, filed on Aug. 7, 2018, now Pat. No. 11,113,671, which is a continuation of application No. 15/648,821, filed on Jul. 13, 2017, now Pat. No. 10,062,056, which is a continuation of application No. 13/572,139, filed on Aug. 10, 2012, now Pat. No. 9,710,791, which is a continuation of application No. 11/266,200, filed on Nov. 4, 2005, now abandoned.

(51) Int. Cl.
  *G06F 15/16* (2006.01)
  *G06Q 10/10* (2012.01)
  *H04M 1/72436* (2021.01)

(52) U.S. Cl.
  CPC ...... *G06Q 10/107* (2013.01); *H04M 1/72436* (2021.01)

(58) Field of Classification Search
  CPC .................. G06Q 10/107; H04M 1/72552
  USPC ........................... 709/204, 205, 206
  See application file for complete search history.

(56) References Cited

U.S. PATENT DOCUMENTS 6,128,651 A  10/2000  Cezar
6,701,346 B1  3/2004  Klein
(Continued)

FOREIGN PATENT DOCUMENTS

EP  0413484  2/1991
WO  9963709  12/1999
(Continued)

OTHER PUBLICATIONS

Haukeland, J-H: "Tsbiff—tildeslash biff—version 1.2.1", internet document, Jun. 1999 (Jun. 1999), XP002215714 *the whole document*.

(Continued)

*Primary Examiner* — Liang Che A Wang
(74) *Attorney, Agent, or Firm* — Rowand LLP

(57) ABSTRACT

A method for updating an electronic mail ("email") message presented to a user on a display screen of a data processing system, the email message belonging to a thread of email messages received by the data processing system, the method comprising: determining whether one or more of the email messages in the thread was received after the email message is opened on the display screen; and, if so, displaying an update message on the display screen indicating that one or more of the email messages in the thread was so received.

30 Claims, 6 Drawing Sheets

(56) References Cited

U.S. PATENT DOCUMENTS

| | | | |
|---|---|---|---|
| 6,741,232 B1 | 5/2004 | Siedlikowski et al. | |
| 6,826,596 B1* | 11/2004 | Suzuki | H04L 51/00 707/999.01 |
| 9,800,712 B2* | 10/2017 | Kraft | H04M 1/72436 |
| 2002/0026483 A1* | 2/2002 | Isaacs | H04L 51/34 709/206 |
| 2002/0091782 A1 | 7/2002 | Benninghoff, III | |
| 2002/0099777 A1 | 7/2002 | Gupta et al. | |
| 2003/0093363 A1 | 3/2003 | Horsfall et al. | |
| 2003/0084038 A1* | 5/2003 | Balogh | G06F 16/2471 |
| 2003/0126136 A1 | 7/2003 | Omoigui | |
| 2004/0202117 A1 | 10/2004 | Wilson et al. | |
| 2004/0255253 A1* | 12/2004 | Marcjan | G06F 3/0486 715/789 |
| 2004/0260756 A1* | 12/2004 | Forstall | G06Q 10/107 709/200 |
| 2004/0260780 A1* | 12/2004 | Eisen | G06Q 10/109 709/207 |
| 2005/0054334 A1* | 3/2005 | Brown | H04W 12/033 455/414.4 |
| 2005/0114781 A1 | 5/2005 | Brownholtz et al. | |
| 2005/0138633 A1 | 6/2005 | Barsade et al. | |
| 2005/0144573 A1* | 6/2005 | Moody | G06F 3/0481 715/825 |
| 2005/0185677 A1* | 8/2005 | Christoffersson | H04L 69/04 370/521 |
| 2005/0193077 A1 | 9/2005 | Nakai | |
| 2005/0223061 A1 | 10/2005 | Auerbach et al. | |
| 2006/0069734 A1* | 3/2006 | Gersh | G06Q 10/107 709/207 |
| 2007/0090923 A1* | 4/2007 | Kraft | H04M 1/72436 340/7.52 |
| 2007/0162454 A1* | 7/2007 | D' Albora | G06Q 10/10 |
| 2007/0288932 A1 | 12/2007 | Horvitz et al. | |
| 2010/0088381 A1* | 4/2010 | Deslandres | H04L 51/12 709/206 |
| 2010/0115559 A1* | 5/2010 | Ellis | H04N 5/44543 725/53 |
| 2012/0116982 A1* | 5/2012 | Yoshida | G06Q 30/016 705/304 |

FOREIGN PATENT DOCUMENTS

| | | |
|---|---|---|
| WO | 0101690 A1 | 1/2001 |
| WO | 02097614 A2 | 12/2002 |
| WO | 03034174 | 4/2003 |

OTHER PUBLICATIONS

Excerpt "explicit", The American Heritage® Dictionary of the English Language, 4th ed., Houghton Mifflin Company, 2004, accessed Mar. 2, 2010 at <http://dictionary.reference.com/browse/explicit>.

Hwang, "Gmail Agent API I Mail Notifier & Address Importer:: Johnvey", May 18, 2005, accessed Aug. 14, 2010 at <http://www.johnvey.com/features/gmailapi/> and <http://johnvey.com/images/gmailapi/gmail-balloon.gif>.

Microsoft Corporation, message box "Do you want to save the changes to 'the currently opened email message'?", Microsoft Office Word 2003 (11.8313.8172) SP3, 2003.

Cardoza, "Special Edition Using Microsoft Office Outlook 2003", Que Publishing, 2004, pp. 27, 28, 665.

Microsoft Corporation, "Description of Office 2003 Service Pack 3", Revision 3.7, Feb. 18, 2008.

Examination Report dated Jun. 20, 2012 from CA 2565485.

Extended Examination Search Report dated Mar. 31, 2006 from EP05110389.3.

Examination Report dated Jun. 9, 2011 from EP05110389.3.

EPO, Summons to Attend Oral Proceedings Pursuant to Rule 115(1) EPC relating to EP application No. 05110389.3, dated Jul. 30, 2015.

Microsoft Corporation, dialog "Do you want to save changes to this message?", Microsoft Outlook Express 5 (5.00.2615.200), 1999, 2 pgs.

"email", Microsoft Computer Dictionary, 4th ed., 1999, Microsoft Corp., p. 165.

USPTO, US Notice of Allowance relating to U.S. Appl. No. 13/572,139, dated Mar. 14, 2017.

MSN Messenger FAQ "Can I send MSN instant messages with Hotmail?", retrieved from http://www.mess.be/_pictures/screenshots/hotmailmessenger02.png on Dec. 28, 2012.

SIMPSON: Windows XP Bible retrieved from http://v.calameo.com/index.htm?langid=en&bkcode=0000199407de692fa4f35&viewModeAtStart=book&trackersource=calameo&language=en on Oct. 7, 2013.

EPO: Summons to oral proceedings pursuant to Rule 115(1) EPC relating to EP application No. 05110389.3, dated Jul. 20, 2020.

* cited by examiner

METHOD AND SYSTEM FOR UPDATING MESSAGE THREADS

REFERENCE TO PRIOR APPLICATIONS

This application is a continuation of U.S. application Ser. No. 16/057,053, filed on Aug. 7, 2018 which is a continuation of U.S. application Ser. No. 15/648,821, filed on Jul. 13, 2017 which is a continuation of U.S. application Ser. No. 13/572,139, filed on Aug. 10, 2012, which claims priority from U.S. patent application Ser. No. 11/266,200, filed Nov. 4, 2005. The entirety of these applications are incorporated herein by reference.

FIELD OF THE INVENTION

This invention relates to the field of electronic mail ("email") messages, and more specifically, to updating message threads for email messages in wireless and other devices.

BACKGROUND

Current wireless mobile communication devices include microprocessors, memory, soundcards, and run one or more software applications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

With respect to email messages, a typical message list for a user may have many threads of messages. A message thread is a sequence of messages relating to the same topic. A simple message thread includes messages that switch back and forth between two recipients much like a conversation. Typically, each message in the thread contains the message text from the body of the message that the user is replying to. The longer the thread goes on, the longer the text of the message is (and the more memory space each reply uses).

Now, consider the following scenario. A user of a wireless device receives one or more messages from an email thread while the device is holstered. The wireless device vibrates to indicate to the user that a message has arrived. When the user removes the wireless device from its holster and observes the wireless device's display screen, the user is presented with the message. The content of the message displayed to the user depends on the timing of receipt of the message. If several other users are responding to the thread, the user may not be shown the most recent message text in the thread for the message displayed. If new messages for the thread are received while the user is reading or responding to one of the earlier messages, it will not be clear to the user that another message for that thread has arrived. In other words, the message thread will not be updated.

One problem caused by the lack of message thread updating is that when a first user responds to a message, the content of the first user's response may have already been sent in a response to the message from a second user. This wastes the time of the first user, who may have composed a message with similar content to that of the second user, as well as the time of other recipients of the messages from the first and second users who must now read the two similar messages.

Therefore, one shortcoming of present wireless and other devices is their inability to effectively update email message threads. Furthermore, the need to effectively update email message threads is increasing in importance with the increase in the number of email related applications being run on wireless and other devices.

A need therefore exists for an improved method and system of updating email message threads in wireless and other devices. Accordingly, a solution that addresses, at least in part, the above and other shortcomings is desired.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

Figure 1:
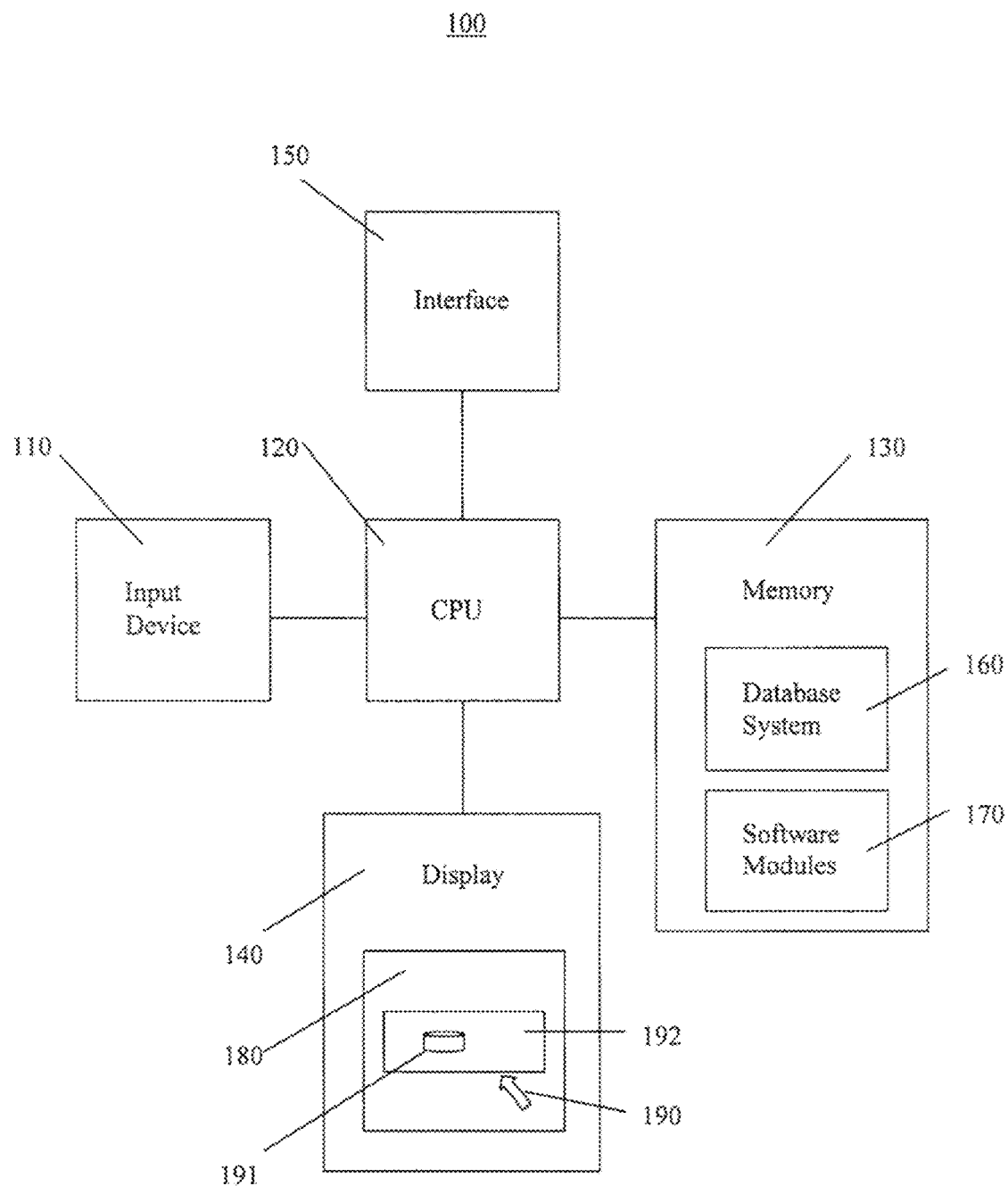
FIG. 1 is a block diagram illustrating a data processing system adapted for implementing an embodiment of the invention.

According to one aspect of the invention, there is provided a method for updating an electronic mail ("email") message presented to a user on a display screen of a data processing system, the email message belonging to a thread of email messages received by the data processing system, the method comprising: determining whether one or more of the email messages in the thread was received after the email message is opened on the display screen; and, if so, displaying an update message on the display screen indicating that one or more of the email messages in the thread was so received.

Preferably, the method further includes determining whether the email message belongs to the thread by comparing subject line text of the email message to subject line text of one or more of the email messages in the thread. Preferably, the determining further includes comparing a time and date of receipt for the email message with times and dates of receipt for one or more of the email messages in the thread. Preferably, the method further includes determining a number of email messages in the thread for including in the update message. Preferably, the method further includes determining an order for the email messages in the thread from the comparing for including in the update message. Preferably, the method further includes: determining whether one or more of the email messages in the thread has been opened by the user from a message read flag associated with each of the email messages in the thread; and, determining with the order at least one of a number of email messages in the thread that were received before the email message and that have not been opened and a number of email messages in the thread that were received after the email message and that have not been opened for including in the update message. Preferably, the method further includes: determining by comparison whether text entered by the user for responding to the email message and text contained in one or more of the email messages in the thread have a similarity; and, if so, including a warning message in the update message indicating the similarity. Preferably, the method further includes displaying the update message in a non-scrolling field within the email message opened on the display screen. Preferably, the update message is at least one of a text message and an icon. Preferably, the data processing system is a wireless device having a clickable thumbwheel. Preferably, the method further includes opening the email message on the display screen when the email message is selected from a list of email messages by the user with the clickable thumbwheel.

In accordance with further aspects of the present invention there is provided an apparatus such as a data processing system, a method for adapting this system, as well as articles of manufacture such as a computer readable medium having program instructions recorded thereon for practising the method of the invention.

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

FIG. 1 is a block diagram illustrating a data processing system 100 adapted for implementing an embodiment of the invention. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (not shown) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present invention. The programmed instructions may be embodied in one or more software modules 170 resident in the memory 130 of the data processing system 100. Alternatively, the programmed instructions may be embodied on a computer readable storage medium (such as a CD disk or floppy disk) which may be used for storing and transporting the programmed instructions to the memory 130 of the data processing system 100. The instructions may thus be embodied in what may be referred to as physical, or alternatively non-transitory, media. Alternatively, the programmed instructions may be embedded in a computer-readable, signal-bearing medium that is uploaded to a network by a vendor or supplier of the programmed instructions, and this signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
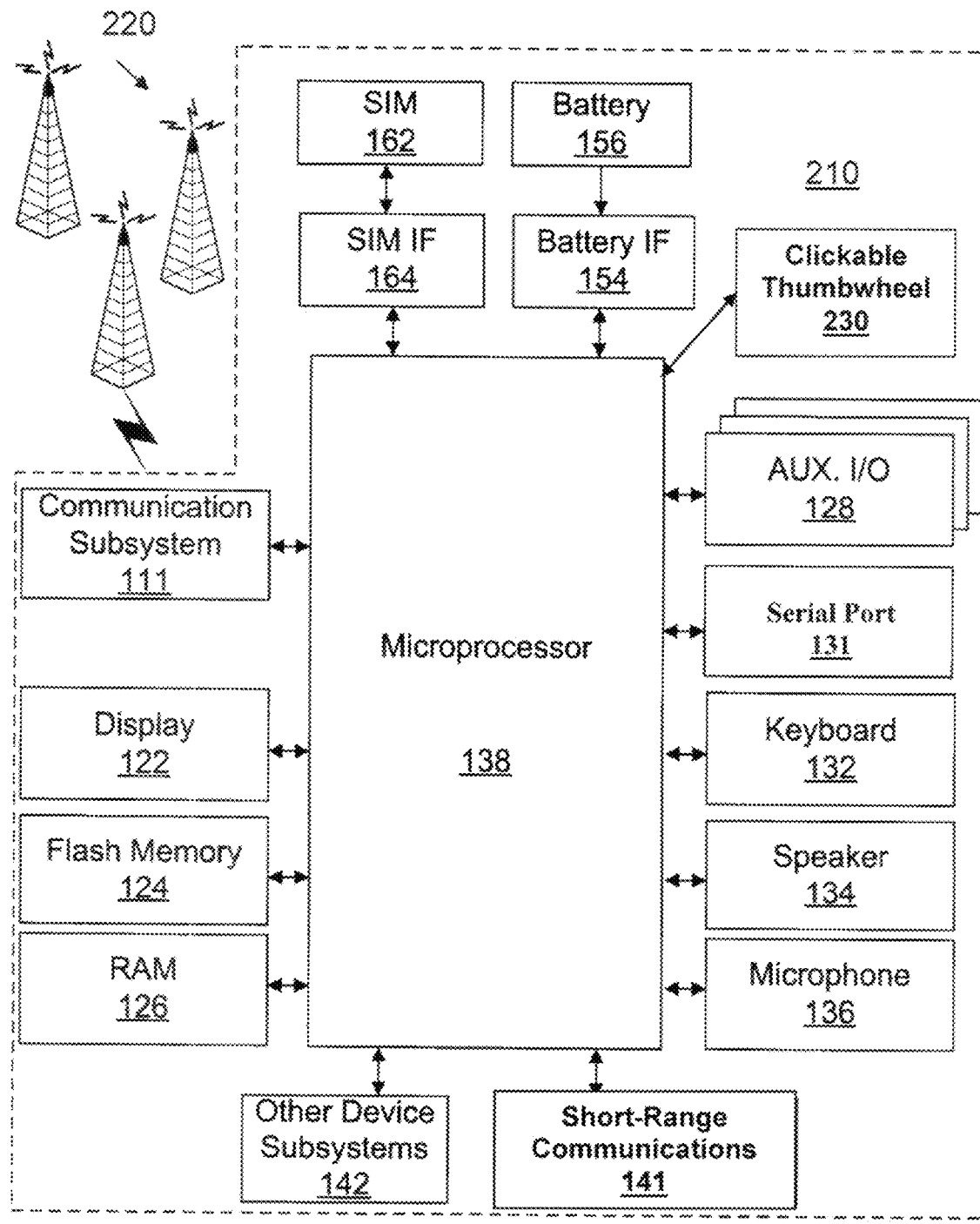
FIG. 2 is a block diagram illustrating a wireless device and a wireless communications system adapted for implementing an embodiment of the invention.

FIG. 2 is a block diagram illustrating a wireless device 210 and a wireless network 220 adapted for implementing an embodiment of the invention. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (not shown) and to a wide area network (not shown) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, or a data communication device (with or without telephony capabilities). The device 210 may communicate with any one of a plurality of fixed transceiver stations 220 within its geographic coverage area.

The wireless device 210 will normally incorporate a communication subsystem 111, which includes a RF receiver, a RF transmitter, and associated components, such as one or more (preferably embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Network access is associated with a subscriber or user of the device 210 and therefore the device 210 requires a Subscriber Identity Module (or "SIM" card) 162 to be inserted in a SIM interface ("IF") 164 in order to operate in the network. The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 131, a keyboard 132, a clickable thumbwheel 230, a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel 230, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the wireless device user's corresponding data items stored and/or associated with a host computer system such as the data processing system 100 thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122, the clickable thumbwheel 230, and possibly the auxiliary I/O device 128. The keyboard 132 is preferably a complete alphanumeric keyboard and/or a telephone-type keypad. The keyboard 132 may also be a reduced key alphanumeric keyboard. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
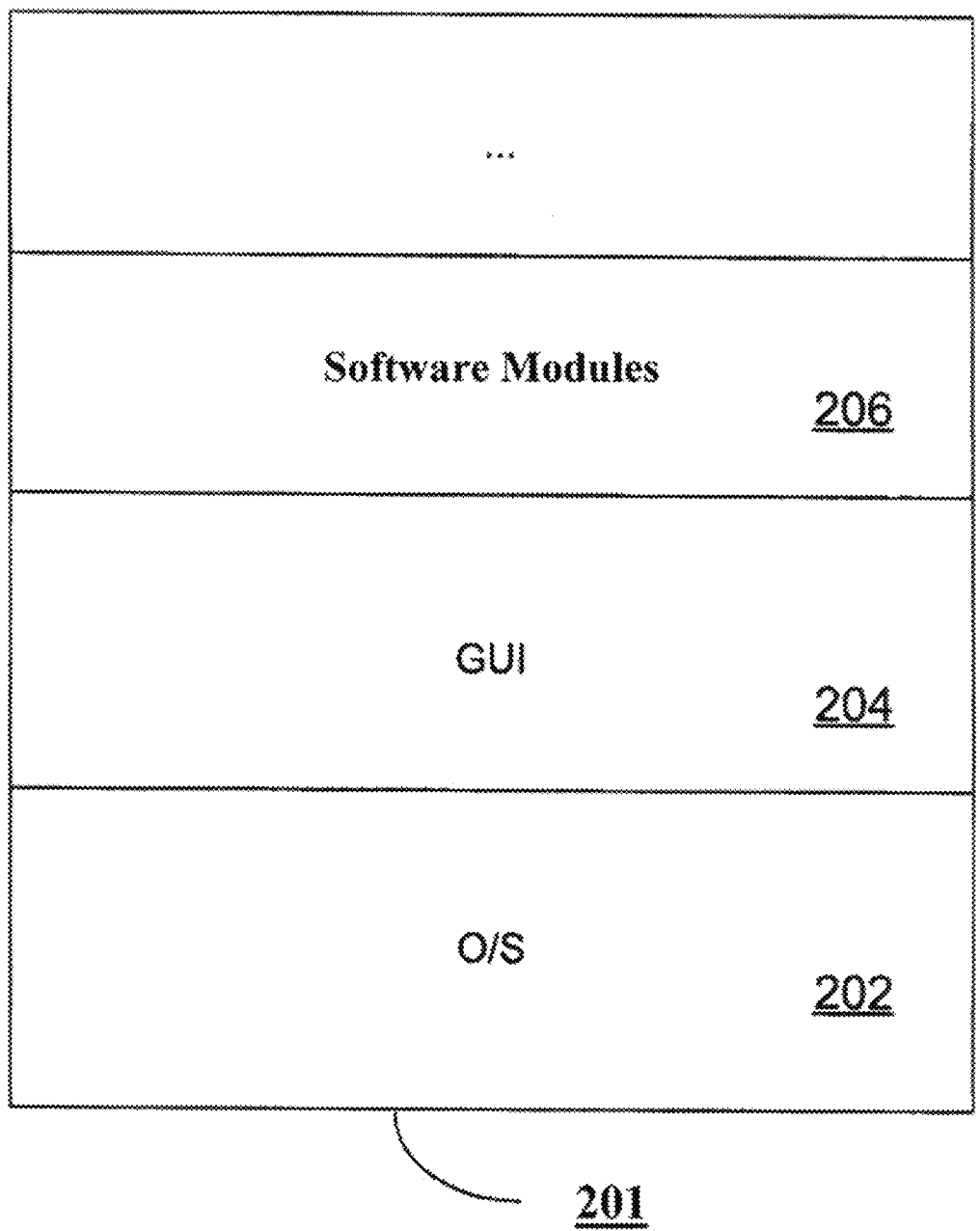
FIG. 3 is a block diagram illustrating a memory of the wireless device of FIG. 2.

FIG. 3 is a block diagram illustrating a memory 201 of the wireless device 210 of FIG. 2 in accordance with an embodiment of the invention. The memory 201 has various software components for controlling the device 210 and may include flash memory 124, RAM 126, or ROM (not shown), for example. In accordance with an embodiment of the invention, the wireless device 210 is intended to be a multitasking wireless communications device configured for sending and receiving data items and for making and receiving voice calls. To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 128, the keyboard 132, the clickable thumbwheel 230, and the like, and for facilitating output to the user. In accordance with an embodiment of the invention, there are provided software modules 206 for updating message threads as will be described below. Though not shown, one or more applications for managing communications or for providing personal digital assistant like functions may also be included.

Thus, the wireless device 210 includes computer executable programmed instructions for directing the device 210 to implement the embodiments of the present invention. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable, signal-bearing medium that is uploaded to a network by a vendor or supplier of the programmed instructions, and this signal-bearing medium may be downloaded through an interface 111, 131, 141 to the wireless device 210 from the network by end users or potential buyers.

Figure 4:
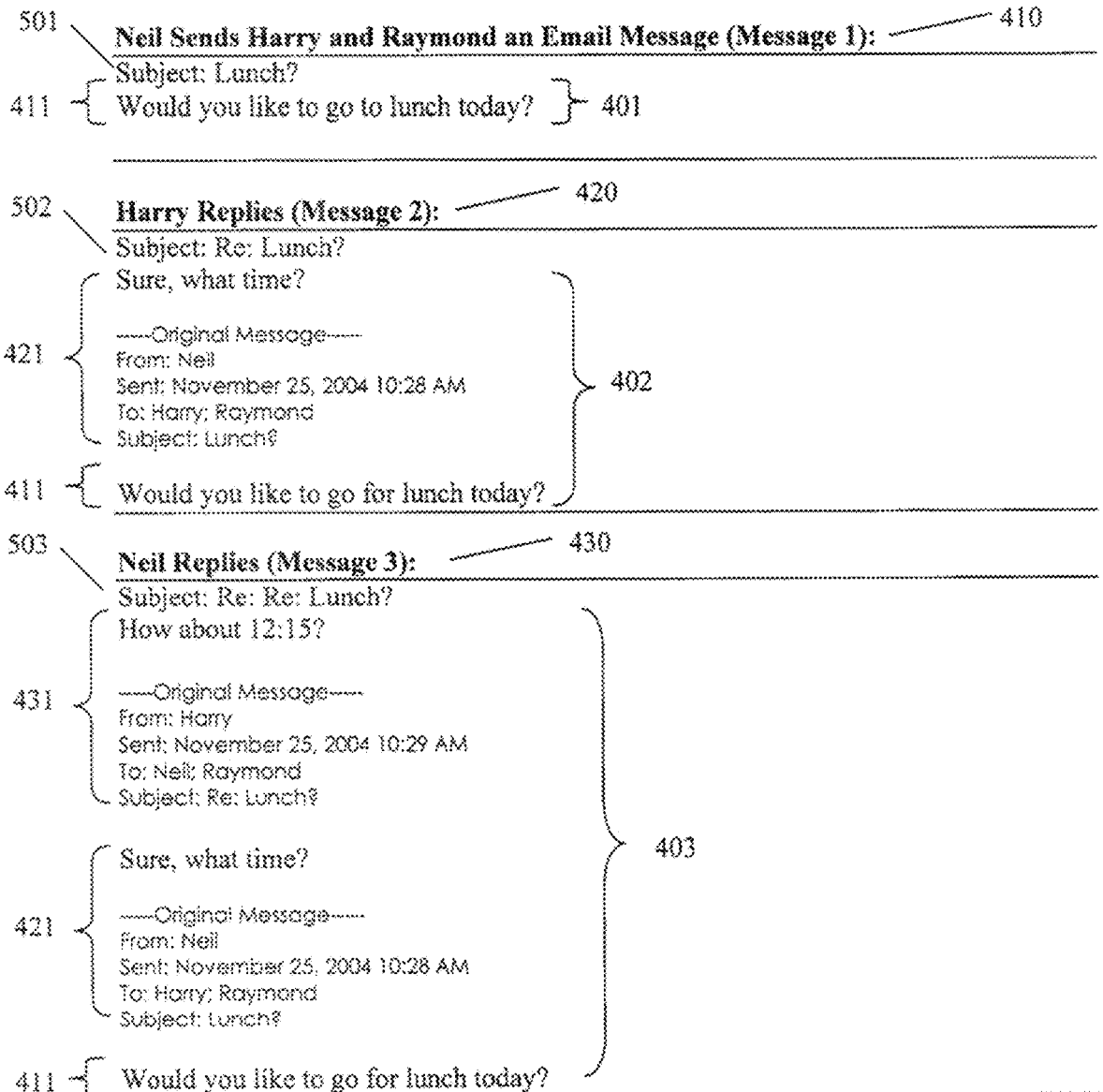
FIG. 4 is a chart illustrating the content of an exemplary email message thread in accordance with an embodiment of the invention.

FIG. 4 is a chart illustrating the content of an exemplary email message thread 400 in accordance with an embodiment of the invention. A first user Neil sends a first email message 410 containing message text 411 to a second user Harry and a third user Raymond. In response, Harry sends a responding second email message 420 containing message text 421 to Neil. The second email message 420 includes the text 411 of the first email message 410. Similarly, Neil may send a third email message 430 containing message text 431 in response to Harry's message 420. The third email message 430 includes the text 411, 421 of first and second messages 410, 420. The linked message text in an email message may be referred to as message thread text 401, 402, 403. In the third message 430, for example, the message thread text 403 includes message text 411, 421, 431 from the first, second, and third messages 410, 420, 430.

Now, recall the scenario described above. A first user of a wireless device 210 receives one or more messages 410, 420, 430 from an email message thread 400 while the device 210 is in its holster. The wireless device 210 vibrates to indicate to the first user that messages 410, 420, 430 have arrived. When the first user removes the wireless device 210 from its holster and observes the wireless device's display screen 122, the first user is presented with the message thread text 402 of a message 420. The message 420 displayed to the user depends on the timing of receipt of the messages 410, 420, 430. If several other users are responding to the message thread 400, the first user may not be shown the most recent message text 431 in the thread 400. If one or more messages 430 for the thread 400 are received while the first user is reading or responding to one of the earlier messages 410, 420, it will not be clear to the first user that a new message 430 for that thread 400 has arrived. In other words, the message thread text 402 in the message 420 that the first user may be responding to may not be the up-to-date message thread text 403.

As mentioned, one problem caused by the lack of message thread updating is that when a first user responds to a message, the content of the first user's response may have already been sent in a response to the message from a second user. This wastes the time of the first user, who may have composed a message with similar content to that of the second user, as well as the time of other recipients of the messages from the first and second users who must now read the two similar messages. Therefore, one shortcoming of present wireless and other devices is their inability to effectively update email message threads. In general, the present invention provides information to users about the messages they receive to reduce responses to these messages that have content that has already been added to the message thread.

Figure 5:
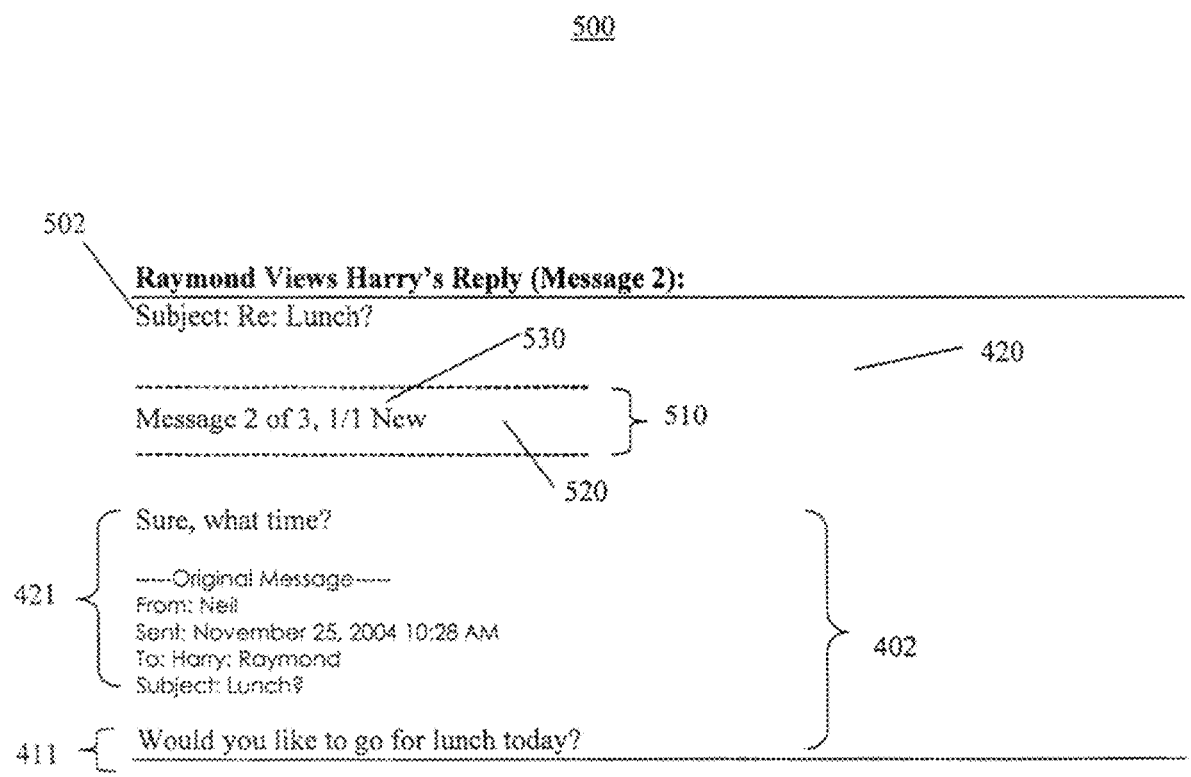
FIG. 5 is a partial screen capture illustrating a graphical user interface ("GUI") for updating a message thread for an opened email message in accordance with an embodiment of the invention; and, FIG. 6 is a flow chart illustrating operations of modules for updating an electronic mail ("email") message presented to a user on a display screen of a data processing system, the email message belonging to a thread of email messages received by the data processing system, in accordance with an embodiment of the invention.

FIG. 5 is a partial screen capture 500 illustrating a graphical user interface ("GUI") 510 for updating an opened email message 420 of a message thread 400 in accordance with an embodiment of the invention. The GUI 510 is displayed on the display screen 122, 140 of the wireless device 210 or data processing system 100 and may be incorporated in the GUI 180, 204 associated with email applications 170, 206 running on the wireless device 210 or data processing system 100.

The GUI 510 has an indicator line 520 that is presented within an open email message 420 that provides information such as an update message 530 about the thread 400 to a user thus providing an update to the currently displayed message thread text 402. The indicator line 520 may also be presented in an open email message that is being composed by a user in response to a received email 420. As will be described below, the indicator line 520 may present several items of information to the user to update the message thread text 402.

According to one embodiment, an update message 530 such as "Response Received" is presented on the indicator line 520 when a new response is received by the user's wireless device 210 or data processing system 100 after the currently displayed message 420 and if the new response has not yet been read or opened by the user. Of course, rather than a text message, a suitable icon (not shown) representing a response received message could be displayed in the GUI 510.

According to another embodiment, an update message 530 such as "X Response(s) Received" is presented on the indicator line 520 for the currently displayed message 420. The "X" variable in the message indicates the number of other users that have replied to the currently displayed message 420. The variable "X" is updated automatically as new messages are received. This information allows the user to determine if there are other replies to the thread 400 that the user should read before replying to the message 420.

For example if there are three messages in the message thread 400 and the user is presently viewing the second received message 420, the message 530 presented on the indicator line 520 would be "2 Message(s) Received". If another message arrives, the message 530 presented on the indicator line 520 would be updated to "3 Message(s) Received".

According to another embodiment, an update message 530 such as "Message Y of X" is presented on the indicator line 520 for the currently displayed message 420. Here, the variable "X" is the total number of messages received relating to the currently displayed thread text 402 and the variable "Y" is the number or order of the currently displayed message 420 within the message thread 400. This information allows the user to determine if there are other replies to the thread text 402 that the user should read before replying to the message 420 as well as which message this is within the thread.

For example if there are three messages in the message thread 400 and the user is presently viewing the second received message 420, the message 530 presented on the indicator line 520 would be "Message 2 of 3". If another message arrives, the message 530 presented on the indicator line 520 would be updated to "Message 2 of 4".

According to another embodiment, an update message 530 such as "Message Y of X, M/N New" is presented on the indicator line 520 for the currently displayed message 420. Here, the variable "X" is the total number of messages received relating to the currently displayed thread text 402, the variable "Y" is the number or order of the currently displayed message 420 within the message thread 400, the variable "M" is the number of unopened messages in the message thread 400 before the currently displayed message 420, and the variable "N" is the number of unopened messages in the message thread 400 after the currently displayed message 420. This information allows the user to determine the number of unopened replies to the thread text 402 that the user should open or read before replying to the message 420 as well as which message this is within the thread. This message 530 provides the user with the most information about the current message 420 in relation to other messages 410, 420 in the message thread 400. With this information, the user can ensure that they have read all messages before responding to the current message.

For example if there are three messages in the message thread 400, the user is presently viewing the second received message 420, and the user has not yet opened the first or third received messages 410, 420, then the message 530 presented on the indicator line 520 would be "Message 2 of 3, 1/1 New". If another message arrives, the message 530 presented on the indicator line 520 would be updated to "Message 2 of 4, 1/2 New".

According to another embodiment, the GUI 510 with its indicator line 520 is presented as a non-scrolling field on the display screen 122, 140. In this way, the indicator line 520 is always presented to the user no matter where the user is currently positioned in the currently displayed message 420. This allows the user to view updates to the message thread text 402 in the indicator line 520 without having to scroll to the top of the message text 421, 411. The indicator line 520 may also be presented on the email compose screen while the user is entering a reply to the message thread 400.

According to another embodiment, a warning message is presented on the indicator line 520 if the user is entering a response to a message that is similar to another response that has already be received. This warning message is generated, for example, upon comparing the text entered in the response being composed by the user with the message text 411, 421, 431 contained in other messages 410, 430 of the thread 400. For example, if five or more words are found to be common among the user's response and the message text contained in other messages of the thread, then the warning message may be presented to the user to inform the user that the response that is being entered is similar to a response that has already been received.

In operation, when a user opens a message 420 in the message thread 400, software modules 206, 170 within the wireless device 210 or data processing system 100 perform operations to search for messages 410, 420, 430 belonging to the message thread 400. To determine if messages 410, 420, 430 belong to the thread 400, the content of the subject line 501, 502, 503 of each message 410, 420, 430 (e.g., Lunch?, Re: Lunch?, Re: Re: Lunch?) in the user's email inbox is compared after first stripping prefix text (i.e., "Re:", "Fw:", etc.). Next, the "message read" flag for each message is accessed to determine if the message has been read (i.e., opened) or not. Finally, the "received date" information for each message is accessed to determine the order of the message within the message thread. The foregoing information is then used to generate a message such as "Message Y of X, M/N New" 530 for presentation on the indicator line 520.

Figure 6:
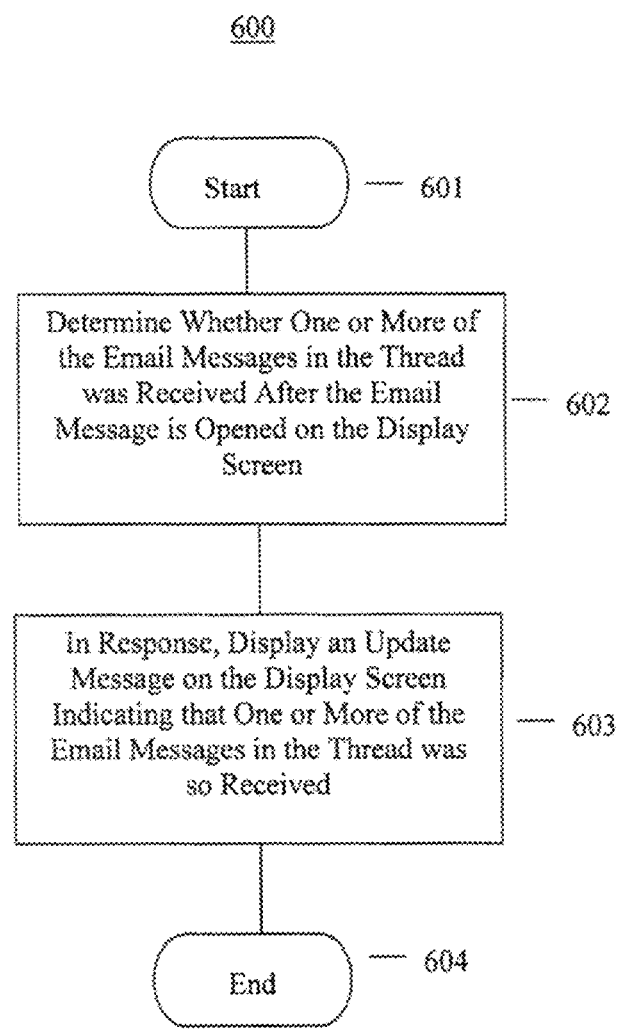

The above described method may be summarized with the aid of a flowchart. FIG. 6 is a flow chart illustrating operations 600 of modules 170 for updating an electronic mail ("email") message 420 presented to a user on a display screen 140 of a data processing system, the email message 402, 420 belonging to a thread of email messages 400 received by the data processing system 100, in accordance with an embodiment of the invention.

At step 601, the operations 600 start.

At step 602, a determination is made as to whether one or more 410, 430 of the email messages in the thread 400 was received after the email message 420 is opened on the display screen 140.

At step 603, if so, an update message 530 is displayed on the display screen 140 indicating that one or more 410, 430 of the email messages in the thread 400 was so received (e.g., "Response Received").

At step 604, the operations 600 end.

Preferably, the method further includes determining whether the email message 420 belongs to the thread 400 by comparing subject line text 502 of the email message 420 to subject line text 501, 503 of one or more of the email messages 410, 430 in the thread 400. Preferably, the determining further includes comparing a time and date of receipt for the email message 420 with times and dates of receipt for one or more 410, 430 of the email messages in the thread 400. Preferably, the method further includes determining a number of email messages in the thread (e.g., "X") for including in the update message 530 (e.g., "X Response(s) Received"). Preferably, the method further includes determining an order for the email messages in the thread (e.g., "Y") from the comparing for including in the update message 530 (e.g., "Message Y of X"). Preferably, the method further includes: determining whether one or more 410, 430 of the email messages in the thread 400 has been opened by the user from a message read flag associated with each of the email messages in the thread; and, determining with the order (e.g., "Y") at least one of a number of the email messages in the thread that were received before the email message and that have not been opened (e.g., "M") and a number of the email messages in the thread that were received after the email message and that have not been opened (e.g., "N") for including in the update message 530 (e.g., "Message Y of X, M/N New"). Preferably, the method further includes: determining by comparison whether text entered by the user for responding to the email message 420 and text 411, 421, 431 contained in one or more of the email messages 410, 420, 430 in the thread 400 have a similarity; and, if so, including a warning message in the update message 530 indicating the similarity. Preferably, the method further includes displaying the update message 530 in a non-scrolling field 510, 520 within the email message 420 opened on the display screen 140. Preferably, the update message 530 is at least one of a text message and an icon. Preferably, the data processing system 100 is a wireless device 210 having a clickable thumbwheel 230. Preferably, the method further includes opening the email message 420 on the display screen 140 when the email message 420 is selected from a list of email messages (not shown) by the user with the clickable thumbwheel 230.

The above described method for updating message threads is generally performed by the data processing system 100. However, according to an alternate embodiment of the invention, the method can be performed by the wireless device 210.

While this invention is primarily discussed as a method, a person of ordinary skill in the art will understand that the apparatus discussed above with reference to a wireless device 210 and a data processing system 100, may be programmed to enable the practice of the method of the invention. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

A portion of the disclosure of this patent document contains material which is subject to copyright protection. The copyright owner has no objection to the reproduction by any one of the patent document or patent disclosure, as it appears in the Patent and Trademark Office patent file or records, but otherwise reserves all copyrights whatsoever.

What is claimed is:

1. A system comprising:
a processor; and
a memory coupled to the processor, the memory including instructions which, when executed, cause the processor to:
display a user interface for responding to a first message; and
while the user interface for responding to the first message is displayed:
receive a second message after the first message, wherein the first message and the second message are in a same message thread; and
based on the first message and the second message being in the same message thread, update the user interface with information to indicate receipt of the second message in the same message thread.

2. The system of claim 1, wherein the user interface includes the first message.

3. The system of claim 1, wherein the information includes a number of unopened messages in the same message thread.

4. The system of claim 1, wherein the information includes a warning message.

5. The system of claim 1, wherein the information includes a total number of messages relating to the first message.

6. The system of claim 1, wherein the information comprises an indicator line.

7. The system of claim 1, wherein the information indicates there are other replies to the same message thread as the first message.

8. The system of claim 1, wherein the first message comprises an email.

9. The system of claim 1, wherein the processor is configured to modify the information while the user interface is displayed each time a message is received that is in the same message thread as the first message.

10. The system of claim 1, further comprising a communication subsystem, and wherein the processor is further configured to receive the second message using the communication subsystem.

11. A processor-implemented method comprising:
displaying a user interface for responding to a first message; and
while the user interface for responding to the first message is displayed:
receiving a second message after the first message, wherein the first message and the second message are in a same message thread; and
based on the first message and the second message being in the same message thread, updating the user interface with information to indicate receipt of the second message in the same message thread.

12. The method of claim 11, wherein the user interface includes the first message.

13. The method of claim 11, wherein the information includes a number of unopened messages in the same message thread.

14. The method of claim 11, wherein the information includes a warning message.

15. The method of claim 11, wherein the information includes a total number of messages relating to the first message.

16. The method of claim 11, wherein the information comprises an indicator line.

17. The method of claim 11, wherein the information indicates there are other replies to the same message thread as the first message.

18. The method of claim 11, wherein the first message comprises an email.

19. The method of claim 11, further comprising:
modifying the information while the user interface is displayed each time a message is received that is in the same message thread as the first message.

20. The method of claim 11, further comprising:
receiving the second message using a communication subsystem.

21. A computer program product comprising a non-transitory computer readable medium storing instructions which, when executed by a processor, cause the processor to:
display a user interface for responding to a first message; and
while the user interface for responding to the first message is displayed:
receive a second message after the first message, wherein the first message and the second message are in a same message thread; and
based on the first message and the second message being in the same message thread, update the user interface with information to indicate receipt of the second message in the same message thread.

22. The computer program product of claim 21, wherein the user interface includes the first message.

23. The computer program product of claim 21, wherein the information includes a number of unopened messages in the same message thread.

24. The computer program product of claim 21, wherein the information includes a warning message.

25. The computer program product of claim 21, wherein the information includes a total number of messages relating to the first message.

26. The computer program product of claim 21, wherein the information comprises an indicator line.

27. The computer program product of claim 21, wherein the information indicates there are other replies to the same message thread as the first message.

28. The computer program product of claim 21, wherein the first message comprises an email.

29. The computer program product of claim 21, wherein the instructions, when executed by the processor, further cause the processor to:
modify the information while the user interface is displayed each time a message is received that is in the same message thread as the first message.

30. The computer program product of claim 21, wherein the instructions, when executed by the processor, further configure the processor to:
receive the second message using a communication subsystem.

* * * * *